United States Patent [19]
Yanagisawa

[11] Patent Number: 5,434,728
[45] Date of Patent: Jul. 18, 1995

[54] MAGNETIC STORAGE UNIT HAVING A MAGNETIC MEDIUM COATED WITH LUBRICANT

[75] Inventor: Masahiro Yanagisawa, Tokyo, Japan
[73] Assignee: NEC Corporation, Tokyo, Japan
[21] Appl. No.: 231,013
[22] Filed: Apr. 21, 1994
[30] Foreign Application Priority Data
Apr. 27, 1993 [JP] Japan .................. 5-122184
[51] Int. Cl.$^6$ ................................ G11B 5/71
[52] U.S. Cl. ................................ 360/97.01
[58] Field of Search ............ 360/97.01; 428/694 TP, 428/694 TF

[56] References Cited

U.S. PATENT DOCUMENTS

| | | | |
|---|---|---|---|
| 4,696,845 | 9/1987 | Yanagisawa | 428/64 |
| 4,897,211 | 1/1990 | Dekura et al. | 252/54 |
| 5,069,973 | 12/1991 | Saito et al. | 428/421 |
| 5,091,225 | 2/1992 | Goto | 427/430.1 |
| 5,221,582 | 6/1993 | Yamakawa | 428/425.9 |

FOREIGN PATENT DOCUMENTS

| | | | |
|---|---|---|---|
| 52-20804 | 2/1977 | Japan . | |
| 52-49805 | 4/1977 | Japan . | |
| 405274656 | 10/1993 | Japan | 428/694 TP |
| 1218515 | 1/1971 | United Kingdom | 360/97.01 |

Primary Examiner—Robert S. Tupper
Assistant Examiner—Adriana Giordana
Attorney, Agent, or Firm—Young & Thompson

[57] ABSTRACT

A magnetic storage unit includes a magnetic storage, a magnetic head, and a power supply. The magnetic storage is composed of a magnetic medium coated on a support to magnetically record information, and a lubricant coated on the magnetic medium and represented by one of formulas below:

$$R^1\text{—oo—}R^2\text{—G and }R^1\text{—COO—oo—}R^2\text{—G}$$

[wherein o represents a phenylene group, $R^1$ represents $C_mX_{2m+1}$ (wherein X represents hydrogen or fluorine and m represents an integer of 1 or more) which may be substituted with a perfluoropolyether group, $R^2$ represents $C_nX_{2n}$ (wherein X represents hydrogen or fluorine and n represents 0 or an integer of 1 or more), and G represents one of —N=N—NH$_2$, —SO$_3$H, and —CN]. The magnetic head slides on the magnetic storage to perform recording and reproduction of information with respect to the magnetic medium. The power supply applies a DC voltage across the magnetic storage and the magnetic head.

12 Claims, 2 Drawing Sheets

MAGNETIC STORAGE UNIT HAVING A MAGNETIC MEDIUM COATED WITH LUBRICANT

BACKGROUND OF THE INVENTION

The present invention relates to a magnetic storage unit such as a magnetic disk unit or a magnetic drum unit.

Generally, a recording/reproducing method of a magnetic storage unit constituted by a recording/reproducing magnetic head (to be referred to as a head hereinafter) and a magnetic storage is as follows. That is, at the start of an operation, the head and the surface of the magnetic storage are so set that they are in contact with each other. Thereafter, a space of an air layer is formed between the head and the surface of the magnetic storage by giving a predetermined rotation to the magnetic storage. In this state, recording or reproduction of data is performed. This method is called a contact start stop method. In this method, the rotation of the magnetic storage is stopped at the end of the operation. In this state, the head and the surface of the magnetic storage are in a frictional contact state as when the operation is started. The frictional force produced between the head and the magnetic storage in this frictional contact state wears the head and the magnetic storage. Eventually, this frictional force damages the head and the magnetic storage in some cases. Also, in the above-mentioned frictional contact state, a slight change in attitude of the head sometimes renders the load on the head nonuniform, giving damages to the head and the surface of the magnetic storage.

To prevent the wear of the magnetic storage caused by the contact and slide with the head, a lubricant such as perfluoropolyether is coated on the surface of the magnetic storage, as described in Japanese Patent Laid-Open No. 52-49805. As this perfluoropolyether, those having no functional groups and those having —COOH, —CH₂OH, —COOCH₃, or a structure represented by the following formula as a functional group have been used.

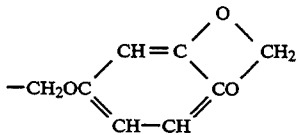

The above conventional lubricant such as perfluoropolyether, however, has a drawback that if the head and the magnetic storage are kept in contact with each other for long periods of time, they adhere to each other and become difficult to separate. This adhesive force increases the static frictional force or the torque, making it impossible to rotate the magnetic disk or causing plastic deformation of a support spring of the head.

SUMMARY OF THE INVENTION

It is a principal object of the present invention to provide a magnetic storage unit which facilitates rotation of a magnetic storage by decreasing the frictional force between a magnetic head and the magnetic storage.

It is another object of the present invention to provide a magnetic storage unit which prevents plastic deformation of a support spring of a head.

To achieve the above objects of the present invention, there is provided a magnetic storage unit comprising at least a magnetic storage composed of a magnetic medium coated on a support to magnetically record information, and a lubricant coated on the magnetic medium directly or via a protective film and represented by Formula (1) below:

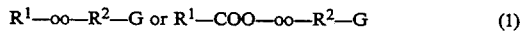

[wherein o represents a phenylene group, $R^1$ represents $C_mX_{2m+1}$ (wherein X represents hydrogen or fluorine and m represents an integer of 1 or more) which may be substituted with a perfluoropolyether group, $R^2$ represents $C_nX_{2n}$ (wherein X represents hydrogen or fluorine and n represents 0 or an integer of 1 or more), and G represents one of —N=N—NH₂, —SO₃H, and —CN], and a recording/reproducing magnetic head for contacting and sliding on the magnetic storage, wherein a voltage is applied across one of the support, the magnetic medium, and the protective film of the magnetic storage and the magnetic head.

In this magnetic storage unit, it is preferable that grooves having anisotropy in the circumferential direction be formed on the magnetic medium or the protective film of the magnetic storage, on which the lubricant is to be coated.

DESCRIPTION OF THE PREFERRED EMBODIMENTS

The preferred embodiments of the present invention will be described below with reference to the accompanying drawings.

Figure 1:
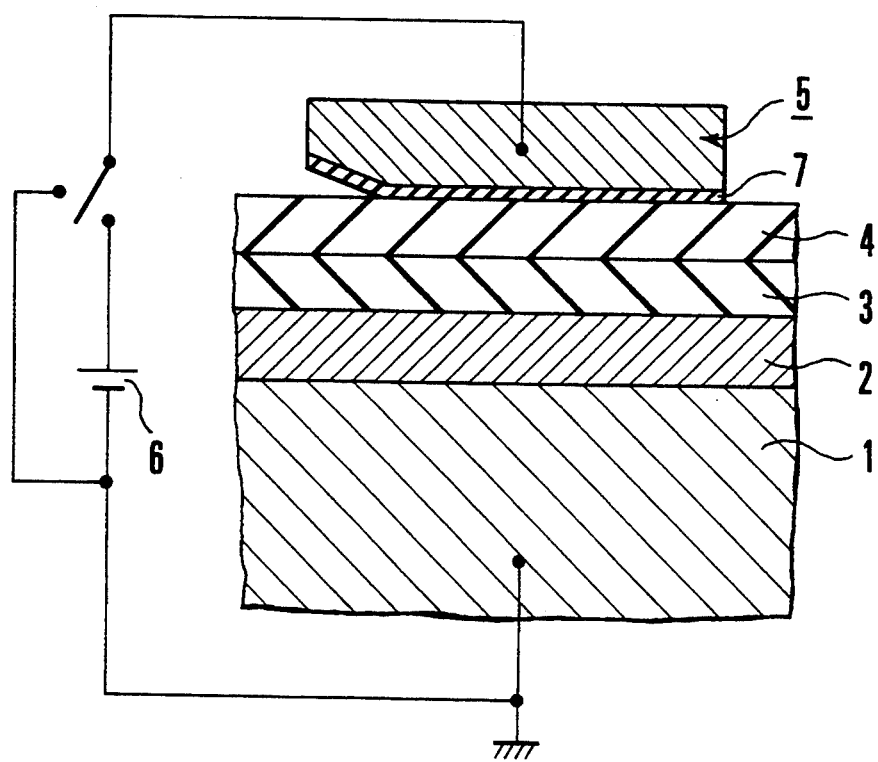
FIG. 1 is a sectional view showing one embodiment of a magnetic storage unit of the present invention.
Figure 2:
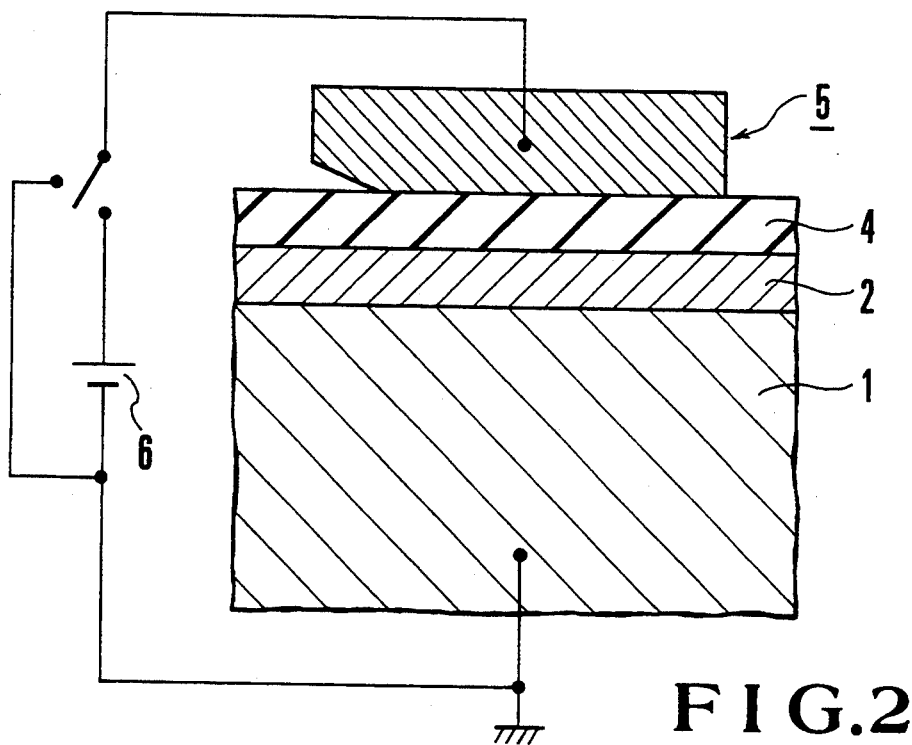
FIG. 2 is a sectional view showing another embodiment of the magnetic storage unit of the present invention.

One embodiment of a magnetic storage unit of the present invention is shown in FIG. 1. Referring to FIG. 1, this magnetic storage unit comprises a magnetic storage and a head 5. The magnetic storage is formed by coating a magnetic medium 2 on a support 1, coating a protective film 3 on the magnetic medium 2, and coating a lubricant 4 on the protective film 3. A DC voltage from a power supply 6 is applied across the support 1 and the head 5. Another embodiment of the magnetic storage unit is illustrated in FIG. 2. Referring to FIG. 2, this magnetic storage unit also comprises a magnetic storage and a head 5. However, the magnetic storage of this embodiment is formed by coating a magnetic medium 2 on a support 1 and coating a lubricant 4 directly on the magnetic medium 2. A DC voltage from a power supply 6 is applied across the support 1 and the head 5.

Figure 3:
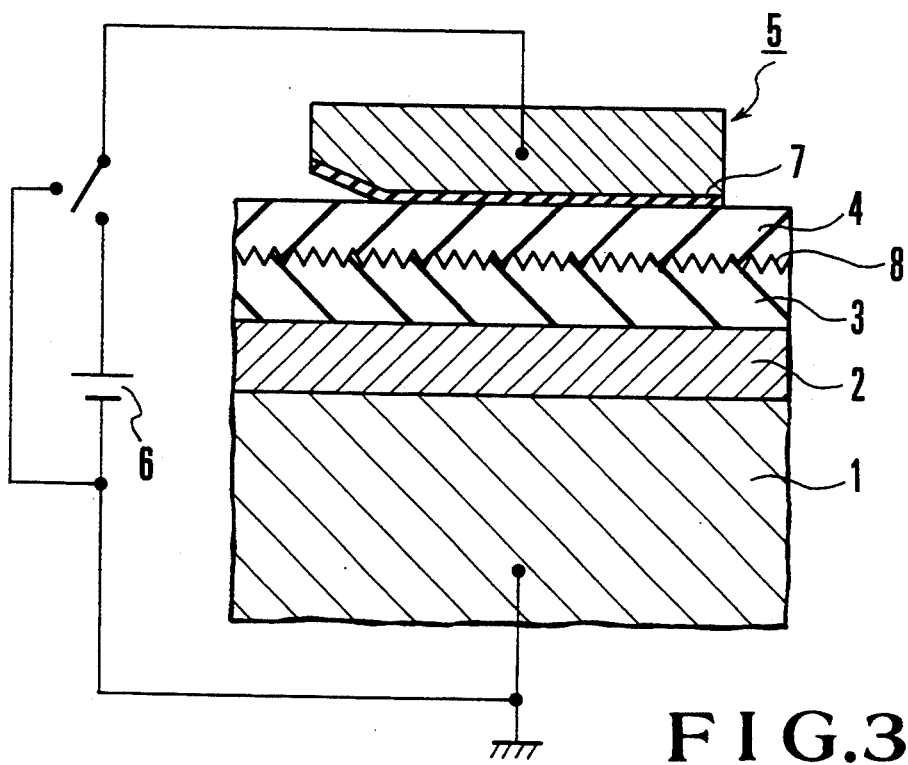
FIG. 3 is a sectional view showing still another embodiment of the magnetic storage unit of the present invention.

FIG. 3 illustrates still another embodiment of the magnetic storage unit comprising a magnetic storage and a head 5. The magnetic storage of this embodiment is formed by coating a magnetic medium 2 on a support 1, concentrically forming grooves 8 having anisotropy in the circumferential direction on a protective film 3 coated on the magnetic medium 2, and coating a lubricant 4 on the protective film 3. A DC voltage from a power supply 6 is applied across the support 1 and the head 5.

Examples of the support 1 used in the present invention are a metal such as an aluminum alloy, a titanium alloy, or a stainless steel alloy; plastic such as polyester, polyimide, polyamidoimide, polyethersulfone, polysulfone, aromatic polyether, an epoxy resin, a urea resin, a melamine resin, polycarbonate, a diallylphthalate resin, an acrylic resin, a phenolic resin, polyphenylenesulfide, polyphenyleneether, a polyacetal resin, polybutyreneterephthalate, a bismaleimidetriazine resin, a polyoxybenzylene resin, a polyaminobismaleimide resin, polyphenyleneoxide, or polyphenylenesulfide; ceramics such as glass, silicon, germanium, alumina, silica, diamond, amorphous carbon, or graphite; and a metal such as an aluminum alloy coated with anodized aluminum, an Ni-P-plating film, Cr, FeNi, stainless steel, Mo, or W.

Examples of the magnetic medium 2 coated on this support 1 are an oxide such as $Fe_3O_4$, $\gamma-Fe_2O_3$, barium ferrite, or $CrO_2$; a nitride such as $Fe_3N_4$; a carbide such as $Fe_5C_2$; a metal containing cobalt such as Co, CoNi, CoNiP, CoMnP, CoMnNiP, CoRe, CoPt, CoNiPt, CoCr, CoCrTa, CoNiRe, CoMnReP, CoFeCr, CoV, CoRu, CoOs, CoPtCr, CoPtV, CoRh, CoCrRh, CoNiMo, CoNiCr, CoNiW, or CoSm; a metal containing iron such as FeNd, FeMg, FeNd, FeAg, FePd, or FeTb; and a metal containing manganese such as MnAl or MnCuAl. It is also possible to use a resin prepared by mixing and dispersing fine particles of the above various magnetic materials.

Examples of the protective film 3 are a silicon compound such as $SiO_2$, $Si_3N_4$, SiC, or a silicic acid polymer; a metal oxide such as $Al_2O_3$, CoO, $Co_3O_4$, $Co_2O_3$, $\alpha-Fe_2O_3$, $Cr_2O_3$, $CrO_3$, $TiO_2$, $ZrO_2$, ZnO, PbO, NiO, $MoO_2$, or $SnO_2$; a metal nitride such as TiN, ZrN, CrN, TaN, or BN; a metal sulfide such as $MoS_2$, $WS_2$, or $TaS_2$; a metal carbide such as TiC, ZrC, CrC, or TaC; a metal fluoride such as graphite fluoride; a metal such as W, Cr, Ir, NiB, NiP, FeCr, NiCr, Sn, Pb, Zn, Tl, Au, Ag, Cu, Ga, Ru, Rh, Mn, Mo, Os, or Ta, or an alloy of each of these metals; a semiconductor such as Si, Ge, B, or C (e.g., amorphous carbon, diamondlike carbon, or a mixture thereof, or graphitelike carbon or a mixture thereof); and plastic such as polytetrafluoroethylene, a phenolic resin, or polyimide.

The lubricant 4 used in the present invention is represented by Formula (1) described above.

Examples of the material of the head 5 are an insulator such as quartz, glass, alumina, sapphire, diamond, or silicon; silicon carbide having conductivity; a sintered body such as alumina-titanium carbide; and a ceramics-based conductor such as manganese-zinc ferrite or nickel-zinc ferrite. It is also possible to use a head manufactured by coating an insulating film 7 consisting of, e.g., diamondlike carbon (formed by a plasma CVD process), $SiO_2$, or alumina on the surface of any of the above materials.

It was found that an applied voltage higher than 10 V had an adverse effect on read/write elements of a head, and that no friction coefficient reducing effect could be obtained by an applied voltage lower than 0.1 V. Consequently, the effective range of the applied voltage was found to be 0.1 to 10 V.

The lubricant represented by Formula (1) for use in the present invention undergoes molecular orientation upon being applied with a voltage. Consequently, the surface of the magnetic storage is covered evenly with the oriented molecules. Therefore, when the head is urged against the medium, these solid members are less brought into direct contact with each other than in a conventional memory unit in which a lubricant is coated unevenly. This reduces adhesion caused by the contact when the magnetic storage starts rotating or caused when the head and the magnetic storage are kept in contact with each other for long periods of time, resulting in a decreased friction coefficient.

In addition, when the lubricant is coated on the grooves having anisotropy in the circumferential direction, the lubricant molecules are readily oriented along these grooves. Furthermore, the application of a voltage encourages this orientation. The result is a large friction coefficient reducing effect. The effect of orientation also changes depending on the structure of a molecule.

Examples 1 to 6 of the magnetic storage unit according to the present invention will be described below.

Example 1

In this example, a magnetic storage with the structure as shown in FIG. 3 was manufactured.

To begin with, a 30-nm thick cobalt-nickel-phosphorus alloy was plated as a magnetic medium 2 for magnetically recording information on a disk-like support 1 formed by coating a nickel-phosphorus-plating film on an aluminum alloy substrate and mirror-finishing the resultant structure to have a surface roughness of 0.02 $\mu$m. Subsequently, as a protective film 3 for protecting the magnetic medium 2, a polysilicic acid (silicic acid polymer) as described in Japanese Patent Laid-Open No. 52-20804 was coated to have a thickness of 20 nm on the magnetic medium 2 by a spin coating process. Thereafter, while the magnetic disk substrate was rotated, a piece of cotton cloth was pressed against the substrate to form concentric grooves 8 with an Rmax roughness of 5 nm in the circumferential direction. The resultant structure was then sintered at 300° C. Subsequently, on the grooves 8 formed on the protective film 3, a Freon solution of each of lubricants A to H having the formulas presented below was spin-coated as a lubricant 4 to have a thickness of 5 nm, thereby manufacturing a magnetic storage. The grooves 8 improved the adsorbability of the lubricant 4 to the protective film 3. Note that if the protective film 3 is omitted as shown in FIG. 2, the grooves 8 can be formed on the surface of the magnetic medium 2. Lastly, a DC voltage of 5 V was applied from a power supply 6 across a head 5 consisting of a sintered body of $Al_2O_3$ and TiC on the surface of which a 10-nm thick diamondlike carbon film was coated as an insulating film 7, and the support 1.

Lubricant A: $C_{17}H_{35}$oOCN
Lubricant B: $C_8F_{17}$oOCN
Lubricant C: $F(C_3F_6O)_5C_2F_4COO$ooCN
Lubricant D: $F(CF(CF_3)CF_2O)_5CF_2$ooCN
Lubricant E: $C_8F_{17}$oOSO$_3$H
Lubricant F: $F(C_3F_6O)_5C_2F_4COO$ooSO$_3$H
Lubricant G: $C_8F_{17}$ooN=NNH$_2$
Lubricant H: $F(C_3F_6O)_5C_2F_4COO$ooN=NNH$_2$ The frictional force between each resultant magnetic storage and the head was measured. Consequently, as shown in Table 1 below, it was found that the friction coefficient was reduced to 25% to 75% or more compared with the case where no voltage was applied.

TABLE 1

| Lubricant | Friction Coefficient |
|---|---|
| Lubricant A | 0.90 |
| Lubricant B | 0.60 |
| Lubricant C | 0.48 |
| Lubricant D | 0.48 |
| Lubricant E | 0.42 |
| Lubricant F | 0.30 |
| Lubricant G | 0.36 |
| Lubricant H | 0.30 |
| Lubricant A (No voltage applied) | 1.20 |

Example 2

Magnetic storages as shown in FIG. 1 were manufactured following the same procedures as in Example 1 except that after a polysilicic acid as a protective film 3 was coated, a lubricant 4 was coated without forming any grooves 8.

The frictional force between each resultant magnetic disk and a head was measured. Consequently, as shown in Table 2 below, it was found that the friction coefficient was reduced to 20% to 50% or more compared with the case where no voltage was applied.

TABLE 2

| Lubricant | Friction Coefficient |
|---|---|
| Lubricant A | 1.44 |
| Lubricant B | 1.20 |
| Lubricant C | 1.08 |
| Lubricant D | 1.08 |
| Lubricant E | 1.02 |
| Lubricant F | 0.90 |
| Lubricant G | 1.02 |
| Lubricant H | 0.90 |
| Lubricant A (No voltage applied) | 1.80 |

Example 3

Magnetic disks were manufactured following the same procedures as in Example 1 except that after carbon was coated as a protective film 3 by a sputtering process using methane as a reaction gas, grooves 8 with an Rmax roughness of 5 nm were formed concentrically in the circumferential direction by pressing a piece of cotton cloth against a magnetic disk substrate while the substrate was rotated.

The frictional force between each resultant magnetic disk and a head was measured. Consequently, as shown in Table 3 below, it was found that the friction coefficient was reduced to 25% to 75% or more compared with the case where no voltage was applied.

TABLE 3

| Lubricant | Friction Coefficient |
|---|---|
| Lubricant A | 1.32 |
| Lubricant B | 0.90 |
| Lubricant C | 0.60 |
| Lubricant D | 0.60 |
| Lubricant E | 0.60 |
| Lubricant F | 0.42 |
| Lubricant G | 0.54 |
| Lubricant H | 0.42 |

TABLE 3-continued

| Lubricant | Friction Coefficient |
|---|---|
| Lubricant A (No voltage applied) | 1.80 |

Example 4

Magnetic disks were manufactured following the same procedures as in Example 1 except that a glass substrate was used as a support 1.

When the frictional force between each resultant magnetic disk and a head consisting of a sintered body of $Al_2O_3$ and TiC was measured, results similar to those given in Table 3 above were obtained.

Example 5

Magnetic disks were manufactured following the same procedures as in Example 1 except that a thin $\gamma$—$Fe_2O_3$ film 50 nm in thickness was coated as a magnetic medium 2 by sputtering and grooves 8 were formed concentrically.

The frictional force between each resultant magnetic disk and a head was measured. Consequently, as shown in Table 4 below, it was found that the friction coefficient was reduced to 25% to 75% or more compared with the case where no voltage was applied.

TABLE 4

| Lubricant | Friction Coefficient |
|---|---|
| Lubricant A | 0.99 |
| Lubricant B | 0.68 |
| Lubricant C | 0.45 |
| Lubricant D | 0.45 |
| Lubricant E | 0.45 |
| Lubricant F | 0.31 |
| Lubricant G | 0.41 |
| Lubricant H | 0.32 |
| Lubricant A (No voltage applied) | 1.50 |

Example 6

Magnetic disks were manufactured following the same procedures as in Example 1 except that a glass substrate was used as a support 1, a thin $Fe_5C_2$ film with a thickness of 50 nm was coated as a magnetic medium 2 by sputtering, a diamondlike carbon film was coated to have a thickness of 2 nm as a protective film 3 by using a plasma CVD process, and grooves 8 were concentrically formed on the protective film. The lubricants used were identical with those used in Example 1.

When the frictional force between each resultant magnetic disk and a head was measured, results similar to those given in Table 3 above were obtained.

Comparative Example 1

A magnetic disk was manufactured following the same procedures as in Example 1 except that perfluoropolyether represented by $F(C_2F_4O)_5(CF_2O)_{15}CF_3$ was coated to have a thickness of 1 nm as a lubricant 4.

Both the friction coefficients of the resultant magnetic disk before and after application of a voltage were 3.10, i.e., no change was found between them.

Comparative Example 2

A magnetic disk was manufactured following the same procedures as in Example 2 except that perfluoropolyether represented by $GCF_2(OCF_2)_{13}(OC_2F_4)_8OCF_2G$ (wherein G represents $-CH_2OH$) was coated to have a thickness of 1 nm as a lubricant 4.

Both the friction coefficients of the resultant magnetic disk before and after application of a voltage were 2.50, i.e., no change was found between them.

As has been described in detail above, in the magnetic storage unit of the present invention, the friction coefficient when a head and a medium are brought into contact with each other is small, and the change in the friction coefficient caused when the head slides on the medium is also small. This results in a high wear resistance. Consequently, no adhesion occurs even after the medium is in static contact with the magnetic head for a long time period. This makes it possible to dramatically improve the reliability compared to that of the conventional magnetic storage units of the comparative examples.

In particular, as described in Examples 1 to 6, the friction coefficient reducing effect of the functional group increases in the order of CN, $SO_3H$, and $N=NNH_2$. In addition, the friction coefficient reducing effect of $R^1$ increases in the order of a hydrogenated hydrocarbon, a fluorinated hydrocarbon, and a perfluoropolyether group substituent. Furthermore, the friction coefficient reducing effect when the lubricant was coated on the grooves formed concentrically in the circumferential direction was larger than that when no grooves were formed.

Note that support springs of heads caused plastic deformation when the magnetic disks of the comparative examples were used because the magnetic disks could not rotate due to a large frictional force. However, no such abnormality was found when the magnetic disks of the examples of the present invention were used.

What is claimed is:

1. A magnetic storage unit comprising:
   a magnetic storage composed of a magnetic medium coated on a support to magnetically record information, and a lubricant coated on said magnetic medium and represented by one of formulas below:

   $R^1-oo-R^2-G$ and $R^1-COO-oo-R^2-G$ wherein o represents a phenylene group, $R^1$ represents $C_mX_{2m+1}$ (wherein X represents one of hydrogen and fluorine and m represents an integer of not less than 1) which may be substituted with a perfluoropolyether group, $R^2$ represents $C_nX_{2n}$ (wherein X represents one of hydrogen and fluorine and n represents 0 or an integer of not less than 1), and G represents one of $-N=N-NH_2$, $-SO_3H$, and $-CN$;
   a magnetic head for sliding on said magnetic storage to perform recording and reproduction of information with respect to said magnetic medium; and
   a power supply for applying a DC voltage of 0.1 to 10 V across said magnetic storage and said magnetic head.

2. A unit according to claim 1, wherein concentric grooves disposed in a circumferential direction are formed on a surface of said magnetic medium in order to increase adsorbability of said lubricant.

3. A unit according to claim 1, further comprising a protective film coated on said magnetic medium to protect said magnetic medium.

4. A unit according to claim 3, wherein said support comprises an aluminum alloy substrate coated with a nickel-phosphorus-plating film, said magnetic medium consists of a cobalt-nickel-phosphorus alloy, and said protective film consists of a silicic acid polymer.

5. A unit according to claim 3, wherein concentric grooves disposed in a circumferential direction are formed on a surface of said protective film in order to increase adsorbability of said lubricant.

6. A unit according to claim 5, wherein said support comprises an aluminum alloy substrate coated with a nickel-phosphorus-plating film, said magnetic medium consists of a cobalt-nickel-phosphorus alloy, said protective film consists of a silicic acid polymer, and said grooves are formed on the surface of said protective film.

7. A unit according to claim 5, wherein said support consists of an aluminum alloy substrate coated with a nickel-phosphorus-plating film, said magnetic medium consists of a cobalt-nickel-phosphorus alloy, said protective film consists of carbon.

8. A unit according to claim 5, wherein said support comprises a glass substrate, said magnetic medium consists of a cobalt-nickel-phosphorus alloy, and said protective film consists of a silicic acid polymer.

9. A unit according to claim 5, wherein said support comprises an aluminum alloy substrate coated with a nickel-phosphorus-plating film, said magnetic medium consists of a thin $\gamma-Fe_2O_3$ film, and said protective film consists of a silicic acid polymer.

10. A unit according to claim 5, wherein said support comprises a glass substrate, said magnetic medium consists of a thin $Fe_5C_2$ film, and said protective film consists of a thin diamond carbon film.

11. A unit according to claim 1, wherein said lubricant has a structure selected from the group consisting of $C_{17}H_{35}ooCN$, $C_8F_{17}ooCN$, $F(C_3F_6O)_5C_2F_4COOooCN$, $F(CF(CF_3)CF_2O)_5CF_2ooCN$, $C_8F_{17}ooSO_3H$, $F(C_3F_6O)_5C_2F_4COOooSO_3H$, $C_8F_{17}ooN=NNH_2$, and $F(C_3F_6O)_5C_2F_4COOooN=NNH_2$.

12. A unit according to claim 1, wherein the DC voltage from said power supply is applied across said support of said magnetic storage and said magnetic head.

* * * * *